(12) United States Patent
Yang et al.

(10) Patent No.: US 7,991,445 B2
(45) Date of Patent: *Aug. 2, 2011

(54) BATTERY COVER LATCHING MECHANISM AND PORTABLE ELECTRONIC DEVICE USING THE SAME

(75) Inventors: Mu-Wen Yang, Taipei Hsien (TW); Chih-Chiang Chang, Taipei Hsien (TW); Zheng Shi, Shenzhen (CN); Zhi-Yun Shen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 387 days.

This patent is subject to a terminal disclaimer.

(21) Appl. No.: 12/166,503

(22) Filed: Jul. 2, 2008

(65) Prior Publication Data
US 2009/0239596 A1  Sep. 24, 2009

(30) Foreign Application Priority Data
Mar. 21, 2008 (CN) .......................... 2008 1 0300651

(51) Int. Cl.
*H04M 1/00* (2006.01)
(52) U.S. Cl. .................. 455/575.8; 429/97; 361/679.01; 16/50; 16/221; 16/225

(58) Field of Classification Search ............... 455/575.1, 455/575.3–575.4, 575.8, 347–351, 90.3, 455/128; 361/679.01–679.03, 679.08–679.09, 361/679.26, 679.3; 439/95, 100; 429/97, 429/98, 100
See application file for complete search history.

(56) References Cited

U.S. PATENT DOCUMENTS

| 7,303,424 | B2 * | 12/2007 | Tu et al. | 439/372 |
|---|---|---|---|---|
| 7,419,742 | B2 * | 9/2008 | Liu et al. | 429/97 |
| 2006/0121338 | A1 * | 6/2006 | Ge et al. | 429/97 |
| 2006/0292439 | A1 * | 12/2006 | Zuo et al. | 429/97 |
| 2007/0003827 | A1 * | 1/2007 | Zuo et al. | 429/97 |
| 2007/0031727 | A1 * | 2/2007 | Hsu | 429/97 |
| 2007/0166608 | A1 * | 7/2007 | Tu et al. | 429/97 |

FOREIGN PATENT DOCUMENTS

| CN | 2651807 Y | 10/2004 |
|---|---|---|
| JP | 8287892 A * | 11/1996 |

* cited by examiner

*Primary Examiner* — Ajit Patel
*Assistant Examiner* — Erica Navar
(74) *Attorney, Agent, or Firm* — Steven M. Reiss

(57) ABSTRACT

A battery cover latching mechanism for a portable electronic device is described. The latching mechanism includes a latching member having a latching portion. The latching portion is resilient and can engage into a latching hole as the latching member is deformed from its original state to it deformed state and securely latched in the latching hole as the latching member is restored to its original state.

18 Claims, 6 Drawing Sheets

BATTERY COVER LATCHING MECHANISM AND PORTABLE ELECTRONIC DEVICE USING THE SAME

BACKGROUND

1. Field of the Invention

The exemplary invention relates to cover latching mechanisms used in portable electronic devices.

2. Description of Related Art

Portable electronic devices usually include latching mechanisms for latching battery covers to housings. The latching mechanisms require frequent installation and removal of batteries relative to the housings.

A typical battery cover latching mechanism includes at least one spring to facilitate the operation thereof. However, the spring tends to wear out over time thus, the battery cover latching mechanism may fail.

Therefore, there exists room for improvement within the art.

BRIEF DESCRIPTION OF THE DRAWINGS

Many aspects of the exemplary a battery cover latching mechanism and a portable electronic device using the battery cover latching mechanism can be better understood with reference to the following drawings. These drawings are not necessarily drawn to scale, the emphasis instead being placed upon clearly illustrating the principles of the exemplary battery cover latching mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

The exemplary battery cover latching mechanism is suitably used in a portable electronic device, such as a mobile phone, a personal digital handset, and so on.

Figure 1:
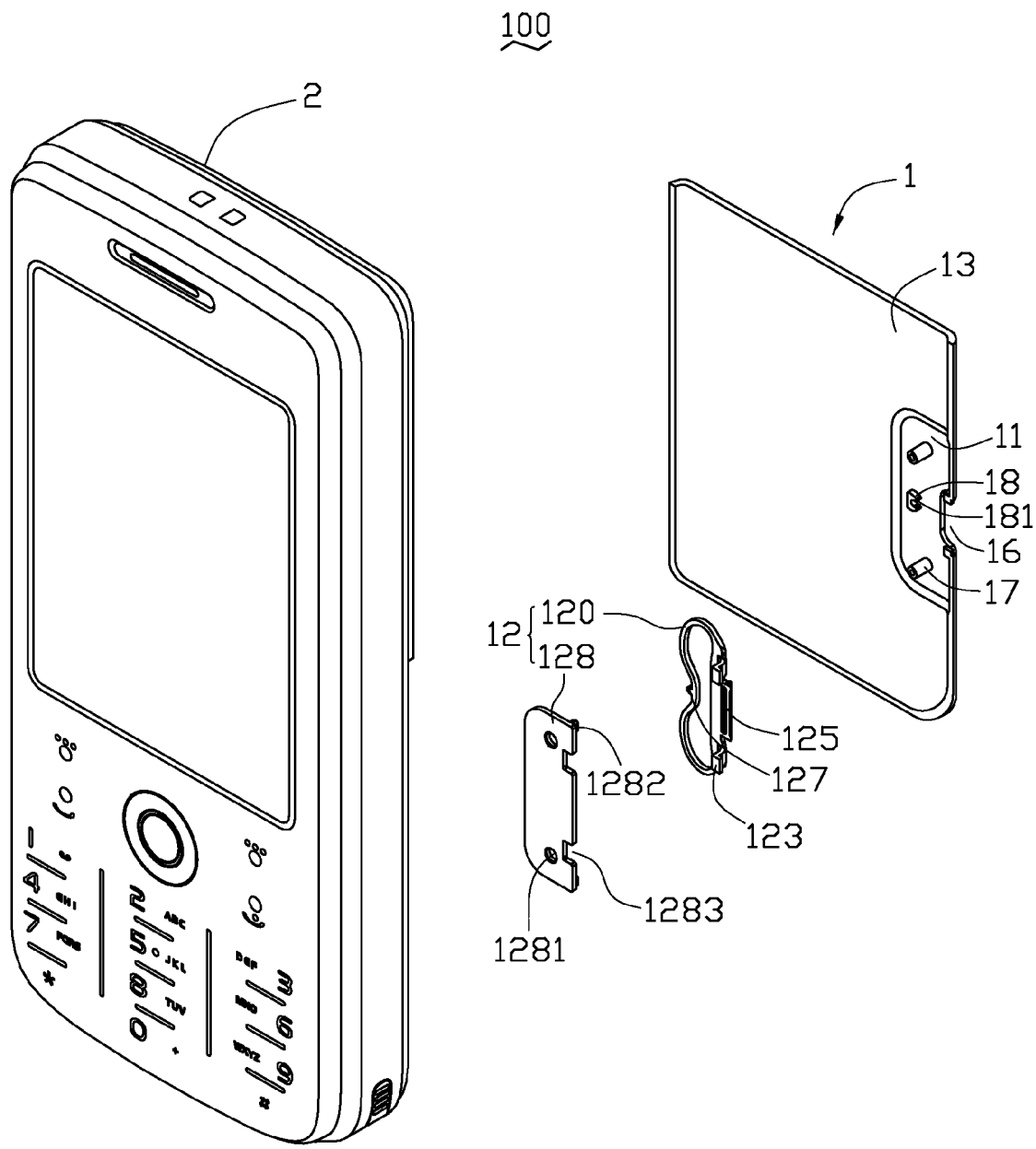
FIG. 1 is an isometric and exploded view of a portable electronic device incorporating a battery cover latching mechanism according to a exemplary embodiment.
Figure 2:
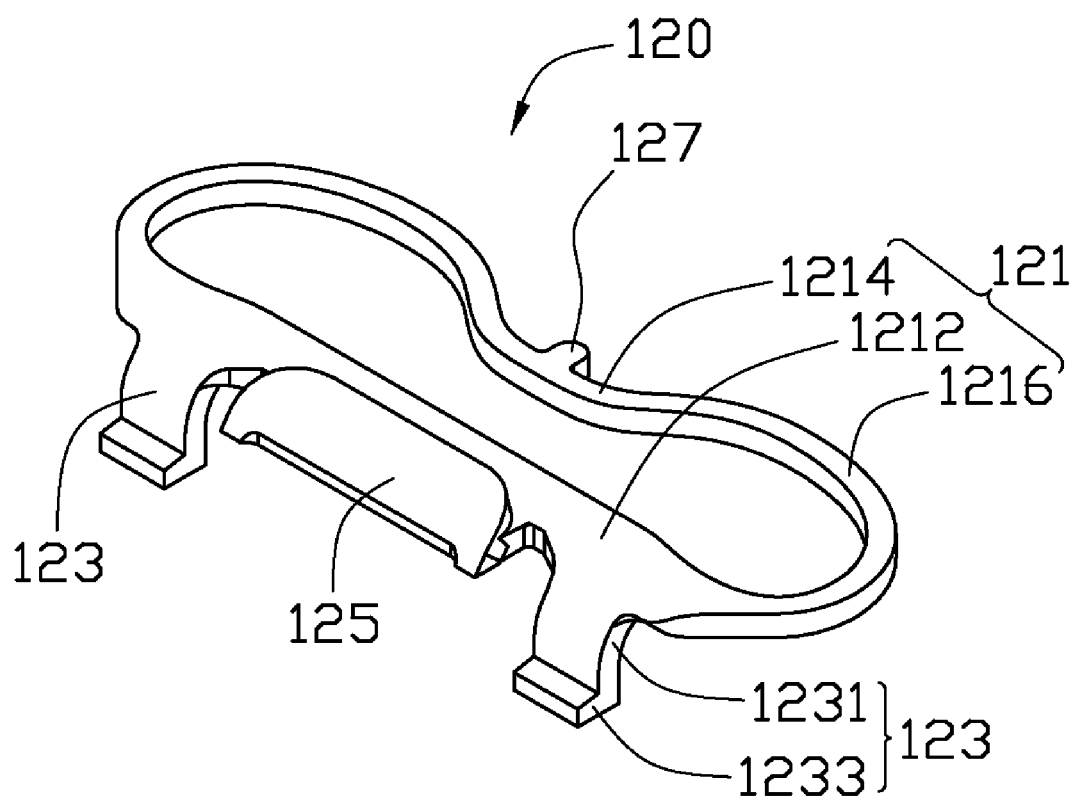
FIG. 2 is an enlarged view of a latching member of the battery cover latching mechanism shown in FIG. 1.

Referring to FIG. 1, the portable electronic device 100 is exemplified and includes a battery cover 1, a housing 2, and a latching device 12. The latching device 12 latches the battery cover 1 to the housing 2, and includes a latching member 120 and a supporting member 128.

The battery cover 1 includes an interior wall 13 facing the housing 2. The interior wall 13 is generally rectangular and defines a receiving groove 11 and a cutout 16. The receiving groove 11 is defined near a corner of the interior wall 13 and has two positioning posts 17 and a latching base 18 protruding therefrom. The cutout 16 is defined along the corner and in communication with the receiving groove 11. The latching base 18 is located between the two positioning posts 17. The latching base 18 defines a generally semi-circular latching slit 181. The latching slit 181 exposes to the cutout 16.

The latching member 120 of the latching device 12 is received in the receiving groove 11. A portion of the latching member 120 is made resilient by being made of a resilient material, such as acrylonitrile-butadiene-styrene (ABS), polycarbonate (PC), etc. The latching member 120 includes a body portion 121, two latching portions 123, a pressing portion 125, and a latching pole 127.

The body portion 121 includes a straight section 1212, a curved section 1214, and two arcuate sections 1216. The two arcuate sections 1216 connect the straight sections 1212 to the curved sections 1214, thus forming a closed loop structure. The closed loop structure is generally shaped like a typical eye-glass frame, and has two partially-enclosed loops arranged at two opposite ends. The partially-enclosed loops communicate with each other by a channel arranged at the central portion of the loop structure.

The two latching portions 123 protrude from the straight section 1212 of the body portion 121. Each latching portion 123 is generally L-shaped and includes a connecting section 1231 and a latching section 1233. The latching section 1233 is substantially perpendicular to the connecting section 1231 and substantially parallel to the body portion 121.

Figure 4:
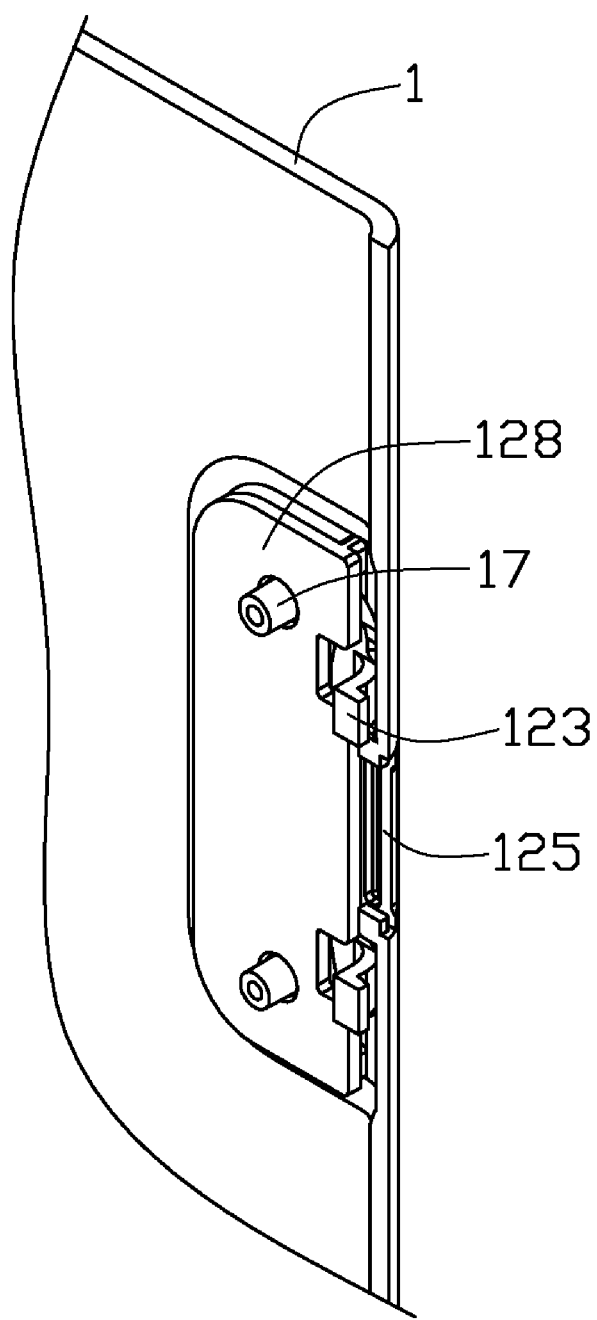
FIG. 4 is a partial assembled view of a latching device and a battery cover shown in FIG. 1, the latching device including the latching member shown in FIG. 2 and the supporting member shown in FIG. 3.

The pressing portion 125 protrudes from the straight section 1212 in an opposite direction to the protruding direction of the two latching portions 123, and is located between the two latching portions 123. The pressing portion 125 is configured for latching into the cutout 16 of the battery cover 1. The latching pole 127 protrudes from the curved section 1214. The latching pole 127 is configured for engaging into the latching slit 181 of the latching base 18 of the battery cover 1, such as by temporary deformation of slit 181 by pole 127. The engagement of the latching pole 127 and the latching slit 181 can be maintained by a positioning of the supporting member 128 (FIG. 4).

Figure 3:
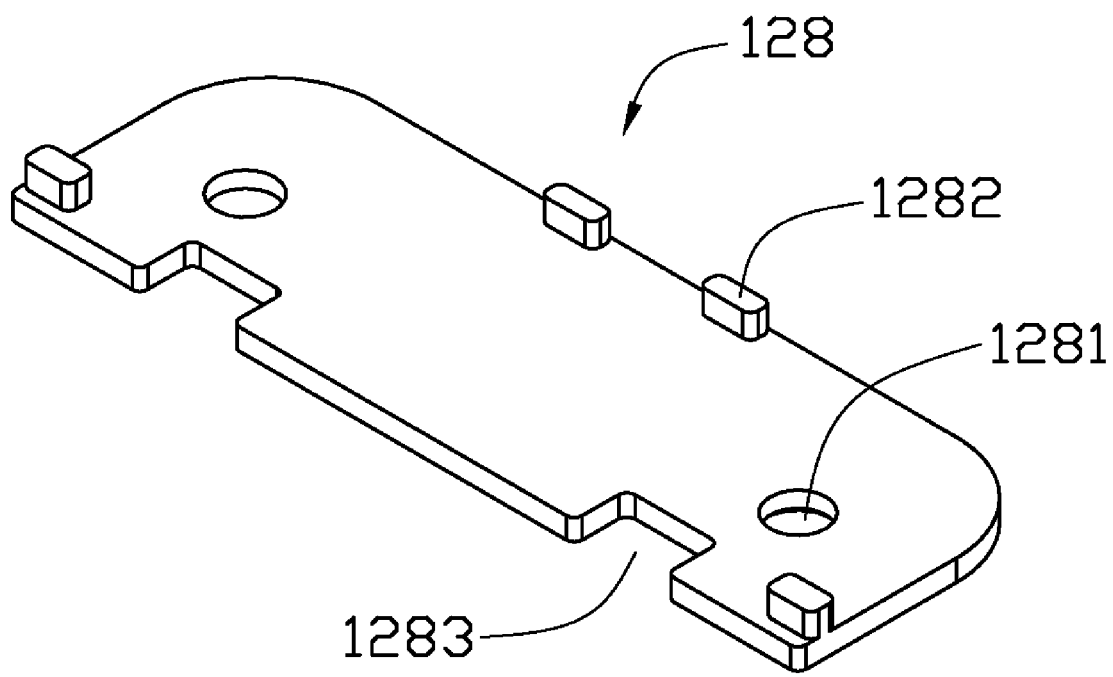
FIG. 3 is an enlarged view of a supporting member of the battery cover latching mechanism shown in FIG. 1.

Referring to FIG. 3, the supporting member 128 has substantially the same shape and size as the receiving groove 11. The supporting member 128 defines two positioning holes 1281 each corresponding to one of the two positioning posts 17, and further defines two openings 1283 each corresponding to one of the two latching portions 123. The two openings 1283 are defined along an edge of the supporting member 128 and through the supporting member 128.

The supporting member 128 has a plurality of contacting portions 1282 formed on an exterior surface thereof. The plurality of contacting portions 1282 are configured for contacting an interior wall of the receiving groove 11 of the battery cover 1, when the supporting member 128 is assembled and secured to the receiving groove 11.

Figure 5:
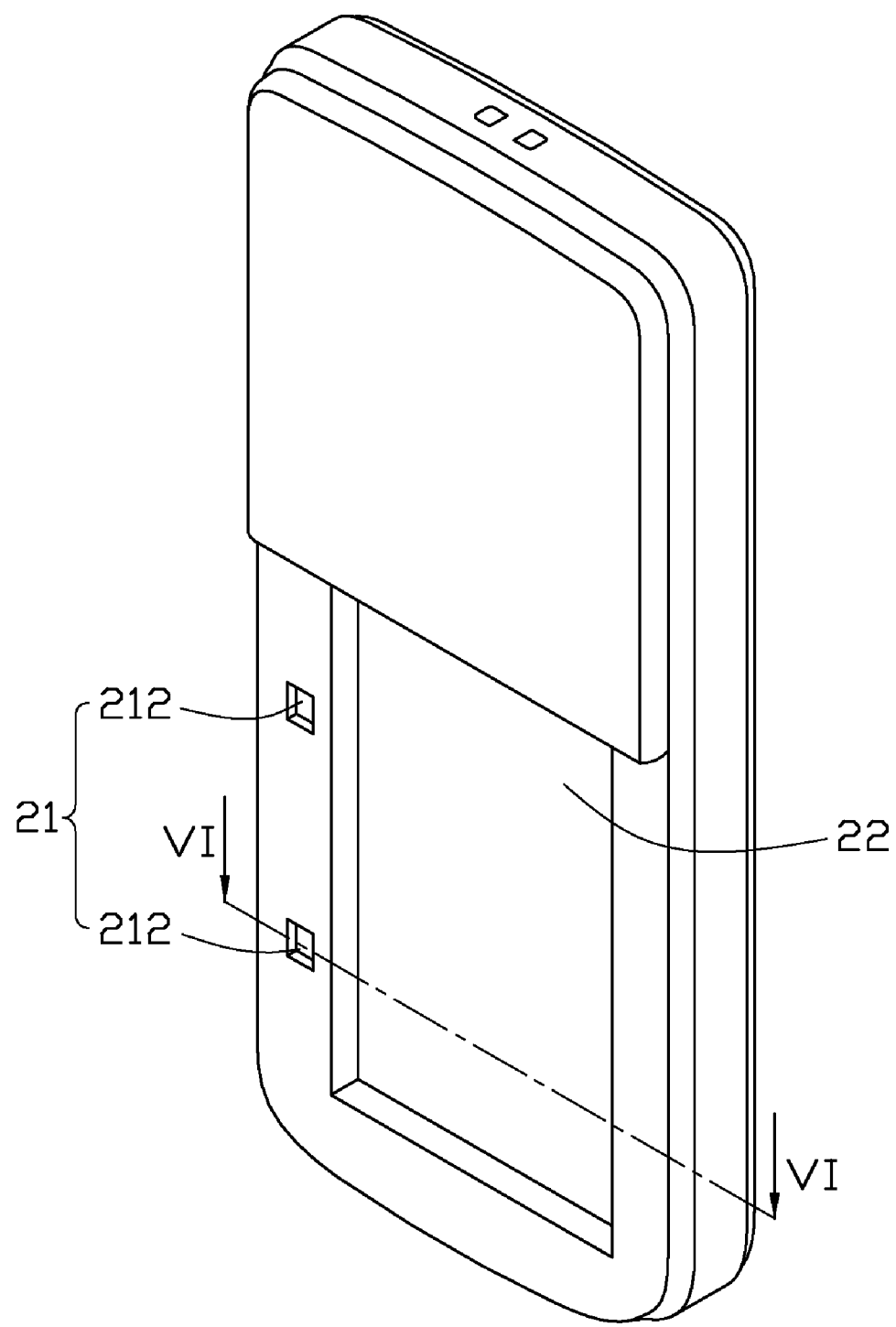
FIG. 5 is similar to FIG. 1, but viewed from another aspect and, merely showing the housing.
Figure 6:
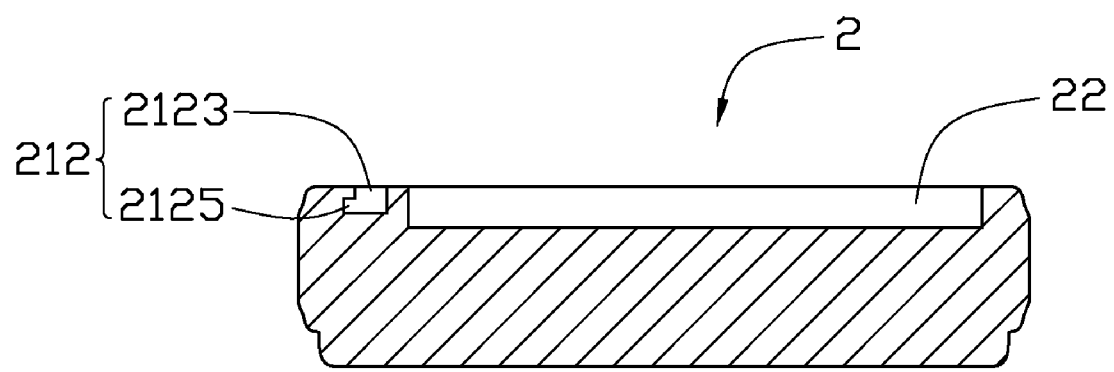
FIG. 6 is a cross-sectional view of the housing, taken along line VI-VI.

Referring to FIGS. 5 and 6, the housing 2 defines a chamber 22 for accommodating a battery (not shown) therein and two latching holes 21 corresponding to the two latching portions 123 respectively. The latching holes 21 have substantially the same shape and size as the latching portions 123 so the latching portions 123 can engage into and/or disengage from the latching holes 21.

Referring back to FIGS. 1 and 4, during assembly, the receiving groove 11 of the battery cover 1 receives the latching member 120 and the supporting member 128. The latching pole 127 is forcedly pushed through and then locked into the latching slit 181 for their plastic deformations. The pressing portion 125 further latches into the cutout 16 so that the latching member 120 is firmly secured to the battery cover 1. At this time, the two latching portions 123 are exposed from the receiving groove 11.

As the contacting portions 1282 contact the interior wall of the receiving groove 11, the two latching portions 123 are exposed by the two openings 1283 and out from the receiving groove 11. The supporting member 128 is secured into the receiving groove 11 by the locking of the positioning posts 17 into the positioning holes 1281. Thus, the latching member 120 is securely received within the receiving groove 11 and between the interior wall 13 and the supporting member 18 by the positioning of the resisting of the supporting member 128.

In use, when chamber 22 is to be covered by the housing 2, the battery cover 1 with the assembled latching device 12 is attached to the housing 2 to cover the chamber 22. The pressing portion 125 is pressed to deform the body portion 121 and align the latching portions 123 with the latching holes 21. The deformed body portion 121 accumulates a resilient force.

After pressing the battery cover 1 towards the housing 2 and releasing the pressing portion 125, the body portion 121 returns to its original state and the resilient force thereof urges the latching portions 123 to engage into the latching holes 21. Thus, the latching device 12 is latched to the housing 2 by the engaging of the latching portions 123 into the latching holes 21. The battery cover 1 is firmly attached to the housing 2.

Conversely, the battery cover 1 can be detached from the housing 2 by pressing the pressing portion 125 and then pushing the battery cover 1 upwardly from the housing 2. The principle of detachment operation and movement of the latching device is similar to the above described attaching process.

For clarity, it should be noted that the structure supporting the battery cover 1 to the side of housing 2 opposite pressing portion 125 has been omitted. However, such hinging structures are conventional.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism for a portable electronic device, the portable electronic device including a battery cover and a housing, the battery cover latching mechanism adapted for attaching the battery cover to the housing and detaching the battery cover from the housing, comprising:
   a latching device attached to the battery cover, the latching device comprising a latching member fixed to the battery cover, and the latching member comprising a latching portion and a closed loop structure; and
   a latching hole defined in the housing corresponding to the latching member such that the latching portion can be securely latched into the latching hole to latch the battery cover to the housing;
   wherein the latching portion is resilient and engages into the latching hole when the latching member is pressed downwardly such that the closed loop structure is pressed to be deformed from its original state to its deformed state, when the latching portion is latched into or detached from the latching hole, the latching member is released and the closed loop structure returns to its original state.

2. The battery cover latching mechanism as claimed in claim 1, wherein the latching member further comprises a body portion, the closed loop structure is formed at the body portion, the closed loop structure contracts in the deformed state.

3. The battery cover latching mechanism as claimed in claim 2, wherein the body portion includes a straight section, a curved section, and two arcuate sections, the two arcuate sections connecting the straight section to the curved sections, the closed loop structure shaped as an eye-glass frame including two partially-enclosed loops arranged at two opposite ends.

4. The battery cover latching mechanism as claimed in claim 3, further comprising a latching base formed on the battery cover, the latching base defining a latching slit, the latching member further comprising a latching pole, the latching pole configured for engaging into the latching slit.

5. The battery cover latching mechanism as claimed in claim 3, further comprising a cutout defined along an end portion of the battery cover, the latching member further comprising a pressing portion, the pressing portion being configured for latching into the cutout.

6. The battery cover latching mechanism as claimed in claim 1, wherein the latching device further comprises a supporting member, the supporting member being configured for positioning the latching member relative to the battery cover.

7. The battery cover latching mechanism as claimed in claim 6, further comprising a positioning post formed on the battery cover, a positioning hole defined by the supporting member, the positioning post being configured for engaging and securing into the positioning hole by plastic deformations thereof.

8. The battery cover latching mechanism as claimed in claim 7, wherein the supporting member further defines an opening, the latching portion exposed through the opening.

9. The battery cover latching mechanism as claimed in claim 1, wherein the latching hole has substantially the same shape and size as the latching portion.

10. A portable electronic device, comprising:
    a battery cover;
    a housing;
    a battery cover latching mechanism configured for attaching the battery cover to the housing and detaching the battery cover from the housing, comprising:
    a latching device attached to the battery cover, the latching device comprising a latching member, the latching member fixed to the battery cover and comprising a latching portion and a closed loop structure; and
    a latching hole defined in the housing corresponding to the latching member such that the latching portion can be securely latched into the latching hole to latch the battery cover to the housing;
    wherein the latching portion is resilient and engages into the latching hole when the latching member is pressed downwardly such that the closed loop structure is pressed to be resiliently deformed from original state to deformed state when the latching portion is latched into or detached from the latching hole, and the latching member is released and securely latched in the latching hole as the latching member restores to original state.

11. The battery cover latching mechanism as claimed in claim 10, wherein the latching member further comprises a body portion, the closed loop structure is formed at the body portion, the closed loop structure contracts at the deformed state.

12. The battery cover latching mechanism as claimed in claim 11, wherein the body portion includes a straight section, a curved section, and two arcuate sections, the two arcuate sections connecting the straight section to the curved sections, the closed loop structure shaped as an eye-glass frame including two partially-enclosed loops arranged at two opposite ends.

13. The battery cover latching mechanism as claimed in claim 12, further comprising a latching base formed on the battery cover, the latching base defining a latching slit, the latching member further comprising a latching pole, the latching pole configured for engaging into the latching slit by plastic deformations thereof.

14. The battery cover latching mechanism as claimed in claim 12, further comprising a cutout defined along an end portion of the battery cover, the latching member further comprising a pressing portion, the pressing portion being configured for latching into the cutout.

15. The battery cover latching mechanism as claimed in claim 10, wherein the latching device further comprises a supporting member, the supporting member being configured for positioning the latching member relative to the battery cover.

16. The battery cover latching mechanism as claimed in claim 15, further comprising a positioning post formed on the battery cover, a positioning hole defined by the supporting member, the positioning post being configured for engaging and securing into the positioning hole.

17. The battery cover latching mechanism as claimed in claim 16, wherein the supporting member further defines an opening, the latching portion exposed through the opening.

18. The battery cover latching mechanism as claimed in claim 10, wherein the latching hole has substantially the same shape and size as the latching portion.

\* \* \* \* \*